United States Patent [19]

Regipa

[11] Patent Number: 4,711,416

[45] Date of Patent: Dec. 8, 1987

[54] STEERABLE LIGHTER THAN AIR BALLOON

[75] Inventor: Robert Regipa, Toulouse, France

[73] Assignee: Centre National d'Etudes Spatiales (C.N.E.S), Paris, France

[21] Appl. No.: 804,887

[22] Filed: Dec. 5, 1985

[30] Foreign Application Priority Data

Dec. 6, 1984 [FR] France .............................. 84 18798

[51] Int. Cl.⁴ ................................................ B64B 1/58
[52] U.S. Cl. ......................................... 244/31; 244/30; 244/126; 244/128; 244/96; 244/97
[58] Field of Search .................. 244/31, 25, 29, 33, 244/96, 97, 128, 30, 126

[56] References Cited

U.S. PATENT DOCUMENTS

| | | | |
|---|---|---|---|
| 2,038,671 | 4/1936 | Olán | 244/30 |
| 2,492,800 | 12/1949 | Isom | 244/97 |
| 3,180,590 | 4/1965 | Fitzpatrick | 244/30 |
| 3,391,883 | 7/1968 | Curtis | 244/31 |
| 3,871,603 | 3/1975 | Menke et al. | 244/31 |
| 4,032,086 | 6/1977 | Cooke | 244/31 |
| 4,033,527 | 7/1977 | Parsons | 244/30 |
| 4,085,912 | 4/1978 | Slater | 244/30 |
| 4,090,682 | 5/1978 | Parsons | 244/31 |
| 4,420,130 | 12/1983 | Regipa | 244/31 |
| 4,434,958 | 3/1984 | Rougeron et al. | 244/126 |

*Primary Examiner*—Joseph F. Peters, Jr.
*Assistant Examiner*—Lynn M. Fiorito
*Attorney, Agent, or Firm*—Harold H. Dutton, Jr.

[57] ABSTRACT

The invention concerns a steered aerostatic balloon and in particular the creation of balloons of large volumes, which are free (airships, space balloons) or captive (material loading or unloading balloons). This balloon has an outer envelope (1) containing air, an interpolar connector (11) connecting the lower pole (2) and the upper pole (3) of this envelope, a grid of longitudinal reinforcements (8) connected to the poles (2) and (3), a grid of circumferential reinforcements (8) connected to the poles (2) and (3), a grid of circumferential reinforcements (7), at least one inside envelope (12) within the first envelope and containing helium, this latter envelope during inflation coming to rest against the outer envelope and being provided with poles fixed on the interpolar connector (11), and lastly air intake means and air evacuation means to and from the outer envelope.

12 Claims, 13 Drawing Figures

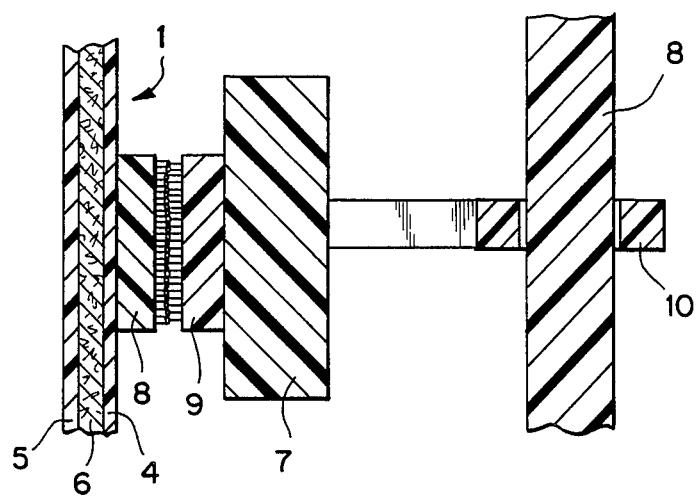
FIG. 3
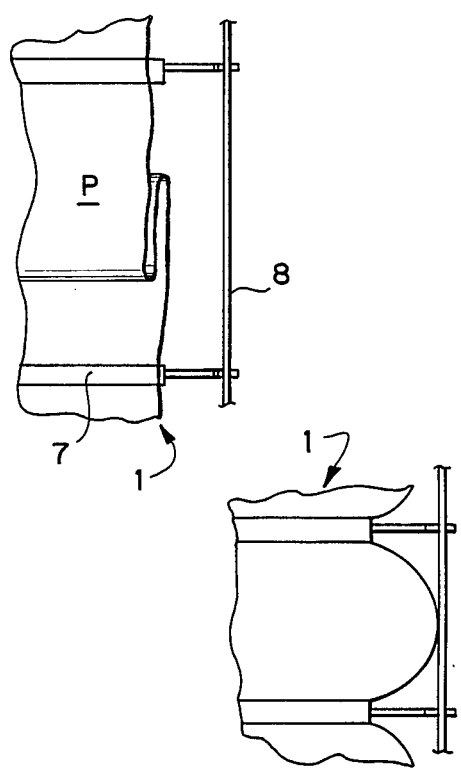
FIG. 4a
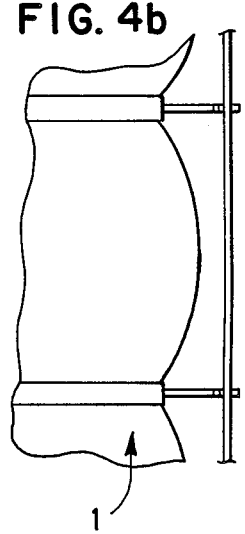
FIG. 4b
FIG. 4c

STEERABLE LIGHTER THAN AIR BALLOON

The invention relates to a steerable aerostatic balloon and in particular to large-volume balloons which may be free (airship, space balloons...) or captive (balloons acting as cranes to load or unload materials).

BACKGROUND

1. Field of the Invention

It is not presently known how to manufacture large-volume balloons capable of withstanding high overpressures while being lightweight enough for practical use. Thus the presently known airships used for shipping high loads have envelope structures capable of withstanding overpressures only up to about 10 millibars (difference between internal and external pressures) before deterioration begins. Under these conditions the variations in the gas masses which can be induced in these balloons are far too inadequate to assure their aerostatic steering in the vertical direction. This steering must necessarily be produced by varying solid or liquid masses, which entails several well known drawbacks (poor steering control during descent, necessity to take on additional loads, precautions required by jettison actions...). Also the aerostatic equilibrium of such balloons is very sensitive to thermal variations and to fuel consumption, and steering the balloon is a delicate operation.

There are also steerable space balloons to carry a payload for the exploration of the atmospheric layers. Again when these balloons are of high volume, their overpressure is low, and as a rule they comprise a carrier balloon inflated with a lighter-than-air gas such as helium and a stabilizer balloon inflated with air and joined to the former and located underneath it. The steering is carried out by varying the pressure of the constant-volume stabilizer balloon by subjecting it to an intake or an exhaust of air. These systems suffer from drawbacks related to the fact that the steering forces are produced solely by the stabilizer balloon: changes in levels are slow to come about and altitude is difficult to control, and at their top altitudes, these balloons also are unstable.

2. Objects of the Invention

The present invention proposes to overcome the drawbacks stated above of the known steered aerostatic balloons.

One essential object of the invention is to provide an aerostatic balloon of which the volume can be very large (up to $10^6$ m$^3$) so as to be capable of transporting high loads, and of which the gas-retaining structure can withstand very high overpressures (several hundred millibars).

Accordingly it is an object of the invention to provide a balloon which can be aerostatically steered by varying the gas masses.

Another object of the invention is to increase substantially the effectiveness of the steering actions (in the vertical direction) in order to make possible rapid and well controlled changes in level regardless of altitude.

Another object is to achieve good balloon stability regardless of altitude and in particular at the upper limit.

Still another object is to make easier the ground-based balloon launching operations.

SUMMARY OF THE INVENTION

The steered aerostatic balloon according to the invention comprises:

a first envelope, called the outer envelope, containing air and with an approximately cylindrical segment and two poles, i.e. a lower and upper pole which are joined by an interpolar connector means, a grid of longitudinal reinforcements extending longitudinally along the outer envelope and joined to both its poles, a grid of circumferential reinforcements extending transversely around the outer envelope, at least one second envelope called the inside envelope and located inside the first envelope and containing a gas which is lighter than air, this inside envelope when inflated resting against the outer envelope and comprising two poles, an upper and lower one, which are joined by the interpolar connector means.

and means for admitting air into the outer envelope and means for evacuating air therefrom. (It should be noted that by "air" is meant the gas forming the atmosphere of the planet where the balloon is deployed).

Therefore, and as will be more clearly seen further below, the structure of such a balloon allows it to withstand high overpressures: the stresses generated by the overpressure are widely absorbed either by the grid of longitudinal reinforcements or by the grid of the circumferential ones, or by the interpolar connector means. In this manner it is possible to provide thin envelopes with very low surface weights while nevertheless subjecting the balloon to overpressures which may reach 500 to 600 millibars. In particular the outer envelope may be made of a material approximately 100 to 300 microns thick, each inside envelope in turn can be made of a still thinner material approximately between 10 and 100 microns thick.

Moreover, in such a balloon where the inside envelope holds the lighter-than-air gas and is integrated into the envelope holding the air, the required steering forces are proportional to the total volume of the outer envelope and thereby benefit from multiplier effect over the conventional systems with two separate balloons.

Similarly the reaction forces exerted on the balloon as the altitude varies are proportional to the total volume of the outer envelope and the balloon enjoys improved stability which remains satisfactory at the limit altitude when the amount of air in the outer envelope has become very low.

Furthermore, for safety (compensation of any leaks, rapid-descent option), each inside envelope may be associated with helium inflating or deflating means.

The balloon of the invention may comprise a single inside envelope within its outer one. It may also comprise several inside envelopes arranged within the outer one as a function of the particular requirements. The inflating and deflating means associated with the envelopes in this instance may include means for transferring gas from one inside envelope to another; they may also be designed to apply different pressures to the various inside envelopes.

In a particular embodiment, several inside envelopes are superposed within the outer one, with the lower pole of the lower inside envelope substantially coinciding with that of the outer one whereas the upper pole of the higher inside envelope coincides substantially with the upper pole of the outside envelope, the other poles of the inside envelopes being fixed in intermediate positions on the interpolar connector means.

The balloon may also comprise several inside envelopes arranged side by side so that they will touch one another when inflated, and/or make contact with the outer envelope, the lower poles of said inside envelopes substantially coinciding with the lower pole of the outer envelope whereas their upper poles substantially coincide with upper pole of said outer envelope.

The invention further applies to the field of space balloons, in particular the stratospheric balloons, to the field of airships (balloons equipped with horizontal and possibly vertical propulsion means, and to captive balloons (balloons tethered to a cable or steered by remote control to move loads).

The balloon of the invention is a basic module which can be combined with several other similar modules either in vertical superposition or in horizontal juxtaposition or again by combining both in order to achieve aerostatic assemblies of very large volumes (high-capacity airships).

BRIEF DESCRIPTION OF THE DRAWINGS

Other features, purposes and advantages of the invention shall become clear in relation the following description and the attached drawings showing illustrative but non-limiting embodiments and an integral part of this description:

FIG. 3 is a detailed section on a larger scale at the outer envelope

FIGS. 4a, 4b and 4c are schematics showing the outer envelope between two circumferential reinforcements in increasingly inflated states.

DESCRIPTION OF THE PREFERRED EMBODIMENTS

Figure 2:
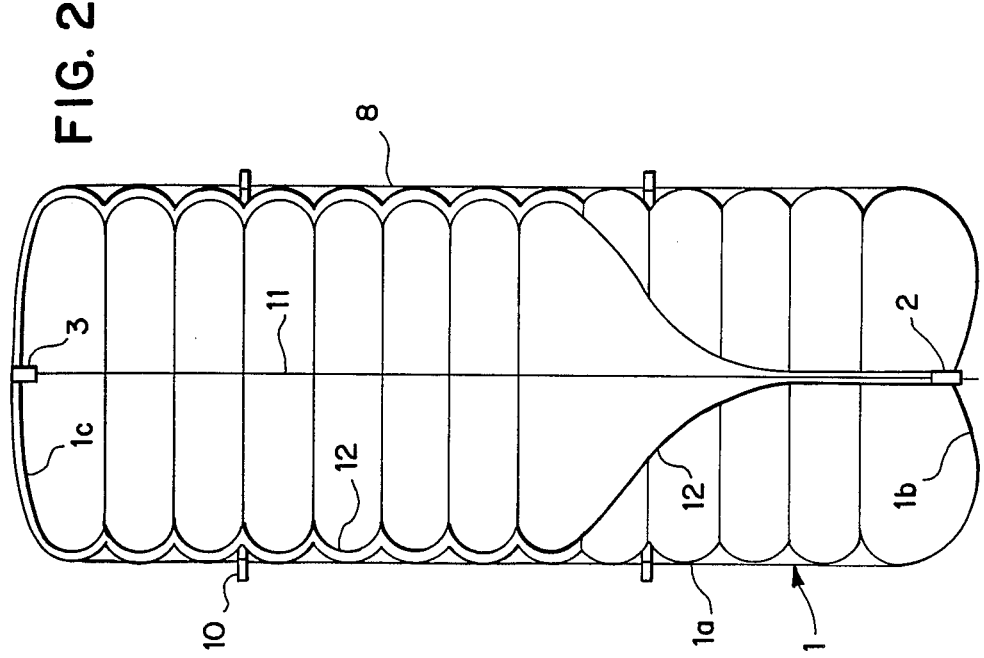
FIG. 2 is a section through a vertical axial plane.
Figure 1:
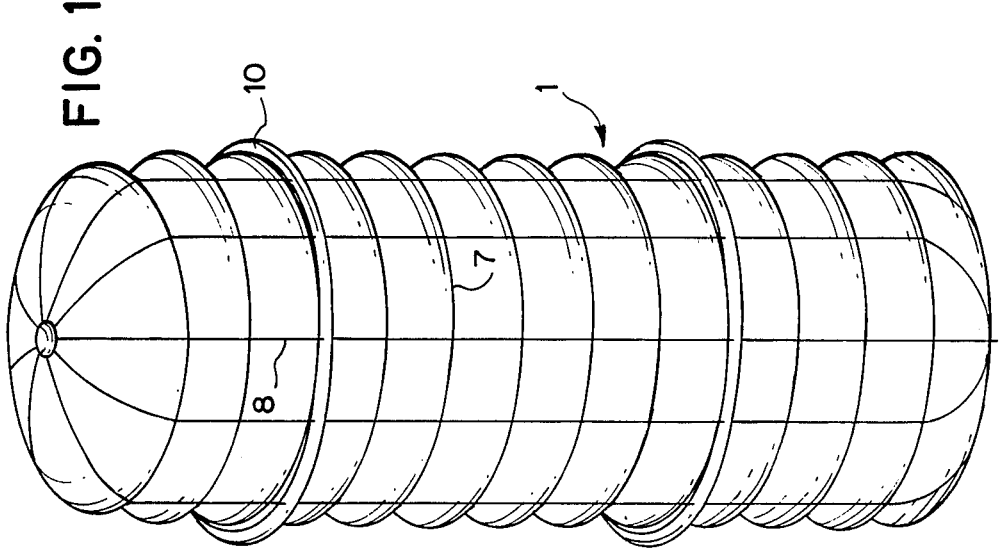
FIG. 1 is a perspective of a balloon of the invention.

The steered aerostatic balloon illustratively shown in FIGS. 1 through 6 comprises the simplest basic module which might be used alone or in combination with other modules to make a space balloon, an airship or a load-moving captive balloon.

This balloon comprises an outside envelope 1 assembled from rectangular gores in any known manner along their rectangular edges. This envelope also includes a cylindrical segment 1a extended by puckered end portions of which the edges may be joined to polar parts 2 and 3 located at the upper and lower poles of the envelope and on latter's axis.

Such an envelope with a cylindrical segment 1a can be made by means of a procedure described in the applicant's French patent No. 2,474,971.

The material of the outer envelope 1 is an airtight composite material which in this example has three layers as shown in FIG. 3: on the outside a heat-sealing polyester film 4, inside a welding polyethylene film 5 and between the two a Kevlar ® polyester fabric 6. The assembly has an overall thickness of about 200 microns.

The fabric 6 includes a polyester filing yarn arranged in the circumferential direction and a Kevlar ® warp yarn arranged in the longitudinal direction. Accordingly the fabric strength is asymmetric, higher in the longitudinal direction than in the circumferential one. Furthermore this fabric is longitudinally inextensible ("inextensible" means a material that will not stretch elastically by more than about 1 to 2%), whereas it has a higher elasticity in the circumferential direction (elongation of about 10%).

The outer envelope 1 is enclosed by a grid of circumferential reinforcements such as 7 and of a grid of longitudinal reinforcements such as 8.

The circumferential reinforcements 7 are located in planes perpendicular to the envelope axis and are spread along its height. Each circumferential reinforcement 7 comprises a high-strength inextensible tape for instance of Kevlar ® 5/10 mm thick and 20 to 50 mm wide; the two ends of each tape are joined by glueing one to the other.

Each tape 7 is bonded at several points to the outer envelope 1 so as to have some slack with respect to it and to only transmit to it stresses which are low compared to those absorbed by this tape. In the example, each tape is fixed by means of conjugate portions 8 and 9 of hook and loop material such as Velcro ® which are glued in opposite directions on one hand on the outer envelope 1 and on the other hand on the tape 7 in question.

Each reinforcing tape 7 thereby is fixed around and outside the outer envelope 1 and in the inflated state of this envelope makes contact with it over its entire periphery without transmitting to it substantial stresses.

The longitudinal reinforcements 8 are located in meridian planes distributed around the outer envelope; they are positioned outside the grid of circumferential reinforcements by positioning means which hold them in place. In this example these positioning means comprise flexible belts 10 (made of fabric or other material) traversed by the longitudinal reinforcements.

Each reinforcement 8 is made of a high-strength inextensible material and as before may comprise Kevlar ® tapes.

The longitudinal reinforcements 8 extend of one piece between the lower and upper poles of the outer envelope and are fixed at these poles to the pole parts 2 and 3.

The outside envelope 1 presents in the longitudinal direction a length greater than the length of each longitudinal reinforcing tape 8, in such a manner that, in the fully inflated state the longitudinal stresses are substantially absorbed by the grid of longitudinal reinforcements 8.

As schematically shown in FIG. 4a, when the outer envelope 1 is less than fully inflated, it exhibits peripheral folds P located between the circumferential reinforcements. Accordingly lobes will appear during inflation between the circumferential reinforcements, and these lobes are more pronounced the higher the overpressure in the envelope (FIGS. 4b and 4c).

The pole parts 2 and 3 are joined by an interpolar and inextensible connector 11 extending along the axis of the outer envelope 1. In this example, this connector comprises a harness of high-strength, inextensible tapes, notably "KEVLAR ®".

The length of the interpolar connector 11 is less than that of the gores forming the outer envelope and is adjusted as a function of the diverse balloon parameters to obtain the desired outer shape (see French patent No. 2,472,971).

Furthermore the balloon includes an inside envelope 12 located within the outer envelope 1; this envelope 12 is made of material similar to that of the outer envelope by assembling rectangular gores of which the lower and upper ends are joined and fixed on the polar parts 2 and 3.

Therefore the inside envelope 12 includes a cylindrical segment 12a of which the diameter is such as to correspond to that of the cylindrical segment 1a of the outer envelope when maximally inflated so that this segment 12a during inflation shall rest against the segment 1a.

Accordingly the inside envelope only need withstand low stresses and can be made of a very thin material, thinner than the outer envelope, in particular about 50 microns thick. This material can be a composite material of the type which has a MYLAR ® layer covered with a film of aluminum to make it impermeable to helium.

The inside envelope is inflated using helium (or another gas lighter than air) while the outer envelope is inflated with air.

Inflation with helium can be carried out solely on the ground during the balloon launch, the upper polar part being provided with a safety valve to allow relief if the inside overpressure exceeds a given limit.

The balloon furthermore may be equipped with on-board inflating and deflating means for the inside envelope in order to increase flight safety (leakage compensation, option of increasing the steering effectiveness in the event of danger).

In any event, the balloon includes on-board means for admitting air into the outer envelope and means for evacuating air. These means are used on the ground to inflate the envelope and in flight for steering (air intake causing the balloon to descend and air evacuation to rise.)

Figure 5:
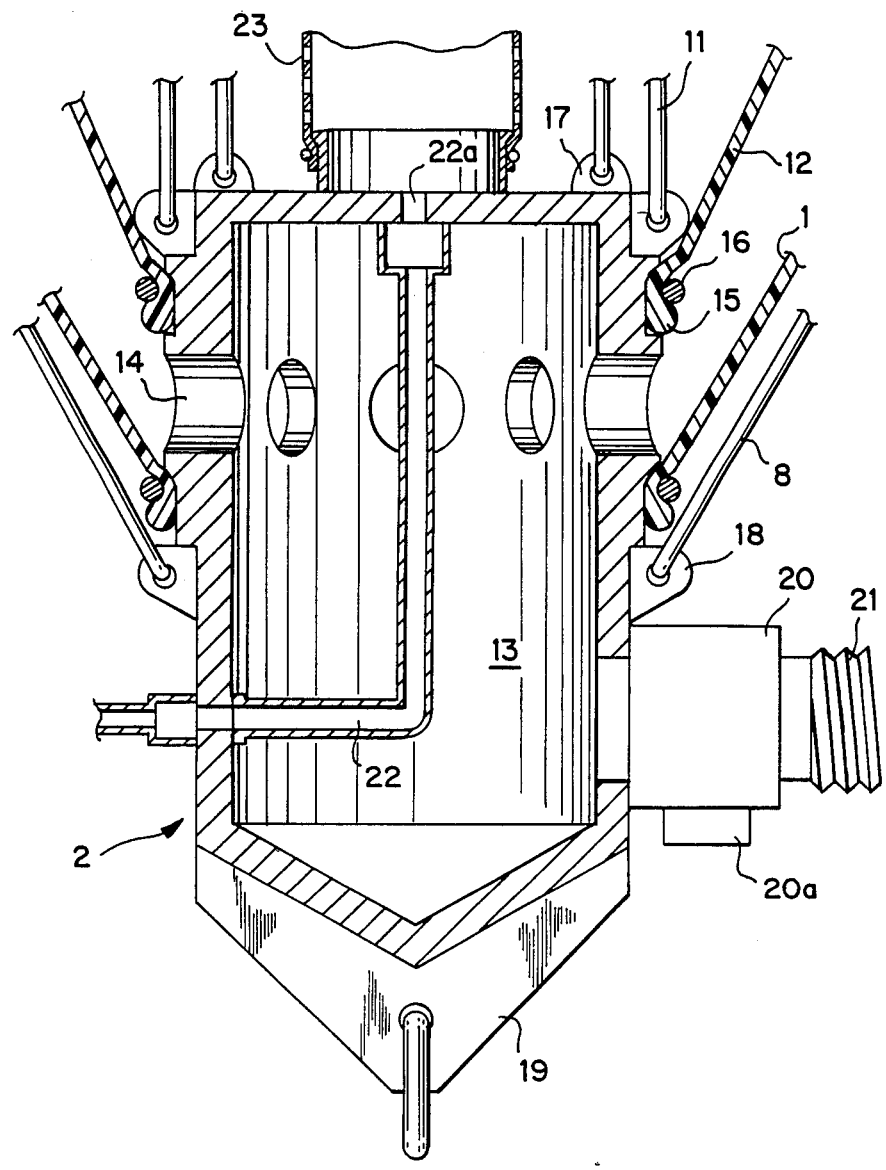
FIG. 5 is a sectional and detailed view of the lower polar part of the balloon.

FIG. 5 is an axial section of the lower pole part 2 which controls this intake or evacuation of air.

This part forms an inner chamber 13 communicating by means of apertures 14 with the inside of the outer envelope 1. For that purpose, the lower part of this outer envelope is hermetically fixed around the pole part below the apertures 14, whereas the lower part of the inside envelope 12 is similarly fastened above the apertures 14.

The fixation of each envelope 1 or 12 around the pole part 2 is implemented by an annular lip 15 integral with the edge of the envelope and by a clamping collar 16.

Moreover, the pole part 2 is provided externally with hook means such as 17 for the tape harness forming the interpolar connector 11 and with hook means such as 18 for the tapes forming the grid of longitudinal reinforcements 8. It is furthermore equipped at its lower part with a loadbearing hookup means 19.

The pole part 2 is equipped with a three-way valve 20 permitting either air evacuation through the outlet 20a, or the intake of compressed air from a turbocompressor (or other equivalent means) through a conduit 21. This turbocompressor is put aboard and can be placed with the load.

The helium inflation of the inside envelope 12 takes place through a conduit 22 hermetically passing through the pole part 2 and issuing at the top of the piece into an orifice 22a on the balloon axis. To avoid any degradation of the inside envelope, a porous stub 23 is provided on the interior thereof around the orifice 22a. This stub extends from one pole to the other: when the conduit 22 is connected to a high-pressure helium source, this stub allows the gas from the inside envelope to expand without danger to said envelope. Obviously a valve shuts the conduit 22 when disconnected from the helium source.

Figure 6A:
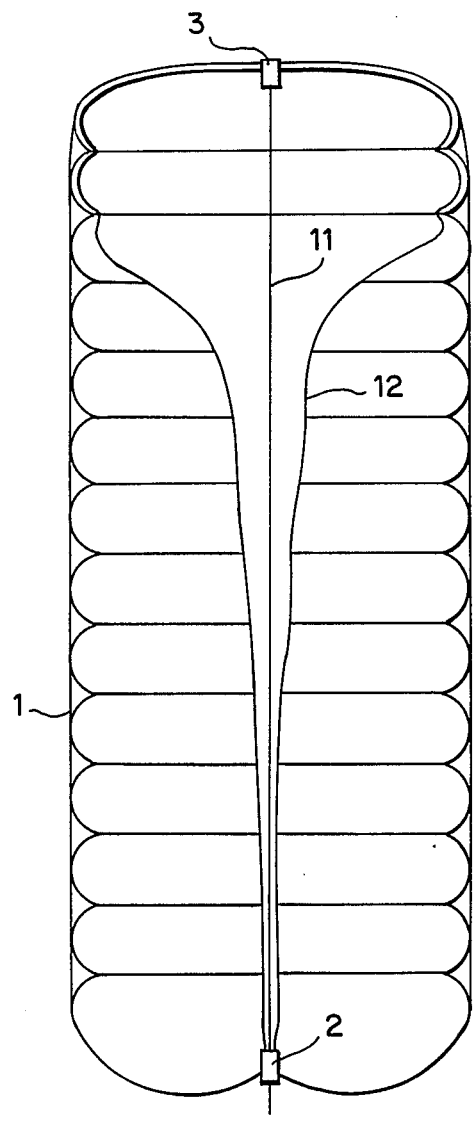
FIGS. 6a and 6b are schematics illustrating the balloon shape respectively at reduced inflation (at takeoff) and when nearly entirely filled.
Figure 6B:
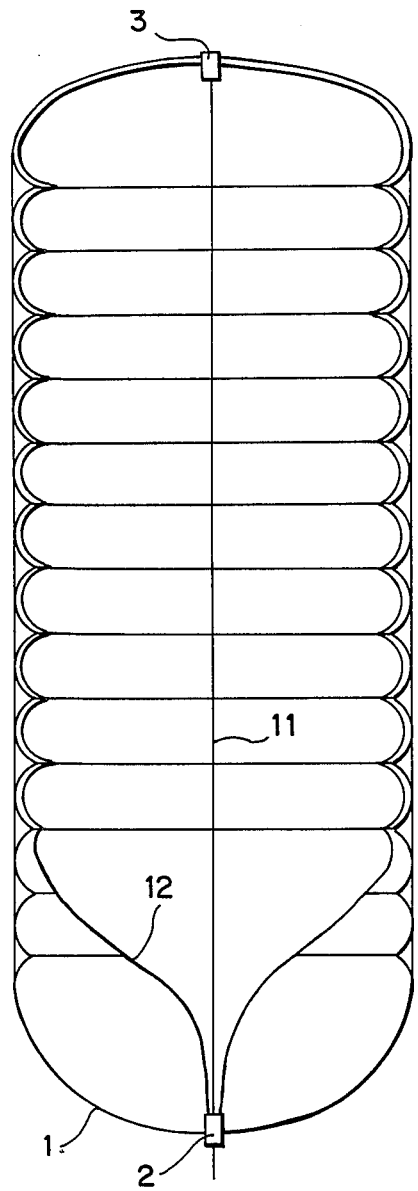

FIGS. 6a and 6b show the above described balloon in two different stages of inflation.

When the balloon is rising (decreasing external pressure), the volume of its inside envelope which contains a constant mass of helium increases, whereas the mass of air in the outer envelope drops, the volume of the balloon as a whole remaining substantially constant.

In such a system, one can show that an admission of air (or evacuation of air) causing an increase, p (or decrease), of the pressure in the outer envelope generates a vertical force E directed downward (or upward), such that:

$$E = g \cdot a \cdot V \cdot (p/pa)$$

where g is the gravitational constant; a is the density of air; V is the total volume of the balloon, and pa is the external pressure.

This steering force therefore is proportional to V, the total volume of the balloon, rather than to merely the volume of air contained in the outer envelope.

In the case of two separate balloons, on the other hand (carrier balloon filled with helium and of volume $V'_1$ and stabilizer balloon containing air and of volume $V'_2$), this steering force E' is given by $$E' = g \cdot a \cdot V'_2 \cdot (p/pa)$$

Because V is much larger than $V'_2$, the steering forces enjoy an advantage in the balloon of the invention by a factor $V/V'_2$.

Similarly the forces of reaction opposing an accidental change in altitude are multiplied by this factor, whereby the balloon stability is significantly improved, especially at the top altitude.

The balloon structure allows inflating its envelopes to substantially higher overpressures than withstood by conventional balloons. The tensional stresses of the inside envelope are absorbed to a large extent by the outer envelope and by the interpolar connector means, by the longitudinal grid 8 and the circumferential grid 7.

It should be noted that the strength asymmetry of the outer envelope and its lobe-structure when inflated contribute to increasing the maximum value of permissible overpressure. The expression of this maximum value includes a term proportional to $t_L/r$, where $t_L$ is the longitudinal tension in the outer envelope at its elastic limit and r is the lobe radius.

The balloon parameters (density of the circumferential grid, density of the longitudinal grid . . . ) are adjusted in each application to optimize the retention means applied to the envelopes so that their material is operating under optimal conditions, that is in each direction at its elastic limit multiplied by a safety factor. In this manner one may achieve the best compromise of overpressure/weight.

It should be noted that where there are accidental over-tensions, the above described structure allows exceeding the elastic limit at the particular lobe of the outer envelope, first in the circumferential direction whereby the possible rupture assumes the shape of a longitudinal slit bounded by two circumferential reinforcing tapes at the edge of the particular lobe. In this manner the balloon will not burst abruptly.

The balloon is launched from the ground by inflating its outer envelope with air. During this inflation, the balloon remains spread on the ground in a position allowing it to be handled more easily than if it were vertical (in this stage, the balloon if desired can be sheltered in a hangar of conventional height and with an elongated shape).

Thereupon the amount of helium required for the mission is fed into the inside envelope. The balloon progressively rises until taking off. It should be borne in mind that the balloon can be easily handled without touching the fragile envelopes which are manipulated through the longitudinal or circumferential taper 8 and 7 respectively.

At takeoff, the inside volume may be one fourth or one third the total balloon volume whereas at the limit altitude it represents nearly all of the balloon volume, the amount of residual air in the outer envelope being slight. The relative inner overpressure within the outer envelope and in the inside envelope may be roughly 500 millibars.

Figure 7:
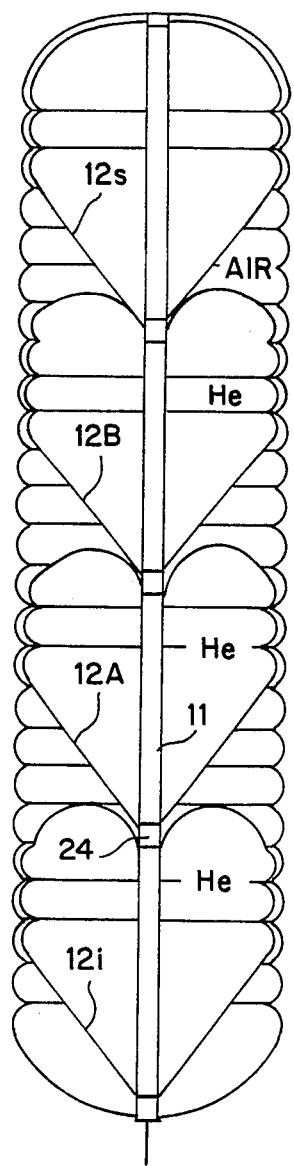
FIG. 7 is a schematic shown in vertical axial section of another embodiment of the balloon.
Figure 8:
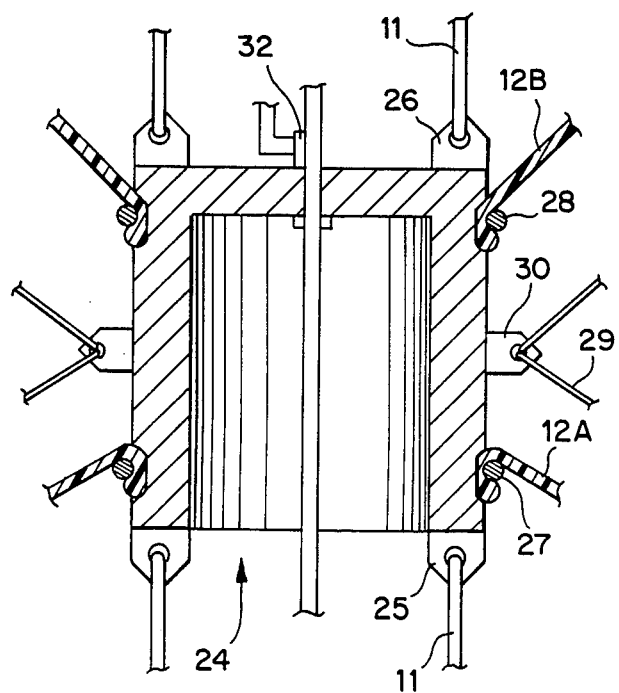
FIG. 8 is a detailed section of an interpolar part located between two superposed inside envelopes of the said balloon.

FIGS. 7 and 8 relate to a variation similar to the preceding one but with several inside envelopes containing helium (similar components in these Figures are shown by the same reference numerals as before). The base 12i of lower inside envelope is fastened to a polar part similar to the polar part 2 described above, while the upper part of the upper inside envelope 12s is fastened to a polar part similar to the polar part 3.

The other poles of the inside envelopes are fixed in intermediate positions on the interpolar connector 11 by an intermediate polar part 24 of which one illustrative embodiment is shown in FIG. 8.

This polar part assumes the shape of an inverted cup an includes hook means 25 for the lower strands of the connector 11, hook means 26 for the upper strands of said connector and fastening means 27 and 28 for the two related inside envelopes 12A and 12B. These latter fastening means are similar to those of the already described polar part.

In this instance furthermore a grid of longitudinal reinforcements such as 29 preferably is associated with each inside envelope and is hooked into means 30 provided for that purpose on the polar part 24. This additional grid comprises Kevlar tapes similar to those already described assuring absorption of the longitudinal tensions exerted on the inside envelopes and higher in this embodiment than in the preceeding.

The already described helium conduit 22 is extended by a flexible conduit 31 located on the balloon axis and permitting independent inflation of each inside envelope with helium due to the electrovalves 32 provided at each envelope Such an embodiment determines additional safety regarding helium leaks because the helium volume is divided into several separate volumes (the leaks of air out of the outer envelope being less significant because of the possibility of compensation by air intake).

It should be noted that the inside envelopes may comprise separate envelopes as described above, and alternatively they also may comprise a single jacket of suitable height clamped at the poles of the inside envelopes by appropriate intermediate polar parts.

Figure 9:
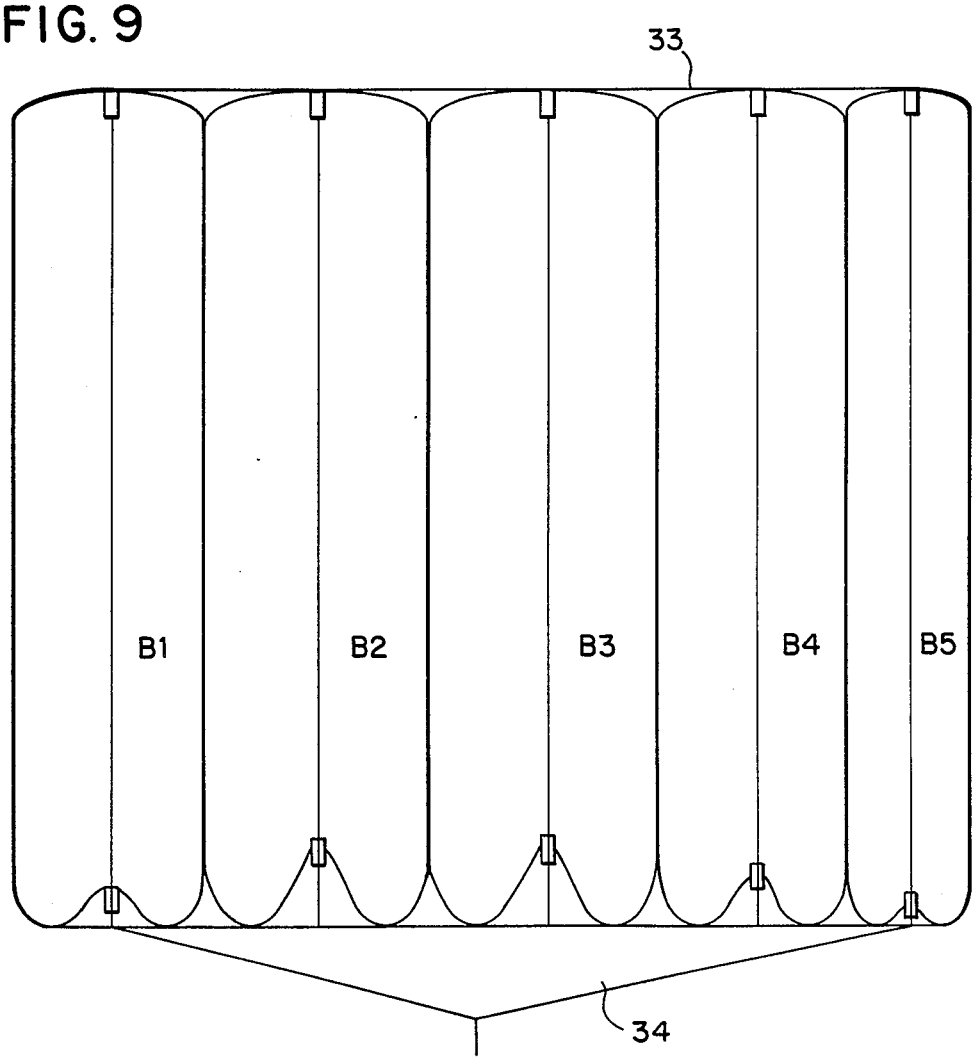
FIG. 9 is a schematic of a vertical axial section of an aerostatic assembly implemented by means of several balloons of the invention.
Figure 10:
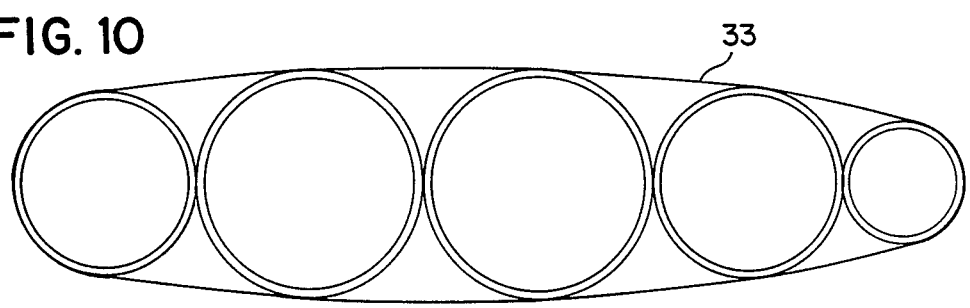
FIG. 10 is a horizontal cross-section of this assembly.

The above described balloons may be combined to form aerostatic assemblies fitted to each application. Illustratively FIGS. 9 and 10 show the combination of five balloons B1, B2, B3, B4 and B5 coupled side by side. These balloons have different diameters and allow forming an assembly with the desired horizontal profile. A filament 33 keeps these balloons in place and assures the cohesion of the assembly The interpolar connectors of each balloon are fastened to a lattice of small beams symbolically shown at 34 and supporting the load.

By combining the balloons of the invention, it is thus possible to make aerostats equipped with sets of horizontal propulsion means and with all the required accessories (fins . . . ). The purely aerostatic stability of these devices allows them to take off and to remain stable at altitude in the absence of relative speed. Furthermore, they can be steered vertically by varying the mass of air they contain, changes in altitude being easily controlled and rapidly achieved.

I claim:

1. A steerable aerostatic balloon comprising a first outer envelope (1) containing air and having a generally cylindrical portion (1a) and upper (3) and lower (2) poles connected by an interpolar connector (11),
   a grid of longitudinal reinforcements (8) extending longitudinally along said outer envelope and connected to said upper and lower poles,
   a grid of circumferential reinforcements (7) extending transversely around said outer envelope so as to divide said outer envelope into a plurality of longitudinal lobes separated by said circumferential reinforcements, said outer envelope having peripheral folds between said circumferential reinforcements when said outer envelope is less than fully inflated for enabling the formation of said longitudinal lobes upon inflation of said outer envelope,
   at least one inner evenlope (12) within said outer envelope and containing a lighter-than-air gas, said inner envelope resting against said outer envelope when inflated and having upper and lower poles attached to said interpolar connector, and
   means for admitting air into said outer envelope and means for evacuating air from said outer envelope.

2. A steerable aerostatic balloon as in claim 1 and wherein each said inner envelope includes a substantially cylindrical portion (12a) resting against said cylindrical portion of said outer envelope when inflated.

3. A steerable aerostatic balloon as in claim 2 and including a plurality of said inner envelopes superposed within said outer envelope, the diameter of the cylindrical portion of each of said envelopes being, when fully inflated, substantially the same as the diameter of said outer envelope so as to support said inner envelopes against said outer envelopes.

4. A steerable aerostatic balloon as in claim 1 and wherein said circumferential reinforcements (7) are fixed on said outer envelope at the ends thereof so that each of said circumferential reinforcements contacts said outer envelope along its entire periphery upon inflation of said outer envelope, and wherein said longitudinal reinforcements are distributed in meridian planes around said outer envelope outside said circumferential reinforcements.

5. A steerable aerostatic balloon as in claim 4 and wherein said longitudinal and circumferential reinforcements comprise high-strength, inextensible tapes; positioning means (10) for retaining said longitudinal tapes in position with respect to said outer envelope; said circumferential tapes being connected to said outer envelope in such a manner as to be able to move with respect to said outer envelope for transmitting to said outer envelope only slight stresses in relation to the stresses absorbed by said positioning means.

6. A steerable aerostatic balloon as in claim 5 and wherein said outer envelope has a greater dimension in the longitudinal direction than said longitudinal tapes whereby in the fully inflated state, longitudinal stresses are substantially absorbed by said longitudinal tapes.

7. A steerable aerostatic balloon as in claim 1 and wherein said outer envelope is made of a material having asymmetric strength so as to be substantially inextensible in the longitudinal direction and slightly elastic in the circumferential direction.

8. A steerable aerostatic balloon as in claim 1 and including means for inflating and deflating each of said inner envelopes with a lighter-than-air gas.

9. A steerable aerostatic balloon as in claim 1 and wherein the material forming said outer envelope has a thickness of about 100–300 microns, and the material forming said inner envelopes has a thickness of about 10–100 microns.

10. A steerable aerostatic balloon as in claim 1 and wherein said interpolar connector comprises a harness of highstrength, inextensible tapes fixed to pole piece (2,3) positioned at the poles of said outer envelope.

11. A steerable aserostatic balloon as in claim 1 and including a plurality of said inner envelopes having poles positioned on said interpolar connector, one of said inner envelopes having a lower pole substantially coinciding with the lower pole of said outer envelope and one of said inner envelopes having an upper pole substantially coinciding with the upper pole of said outer envelope.

12. A steerable aesrostatic balloon as in claim 1 and including a plurality of said inner envelopes arranged in a side-by-side manner so that upon inflation, said inner envelopes contact adjacent inner envelopes and said outer enveloped, and the lower poles of said inner envelope substantially coinciding with the lower pole of said outer envelope, and the upper poles of said inner envelopes substantially coinciding with the upper poles of said outer envelope.

* * * * *